United States Patent
Kuntze-Fechner et al.

(10) Patent No.: US 9,718,542 B2
(45) Date of Patent: Aug. 1, 2017

(54) BLADE ATTACHMENT FOR A BEARINGLESS ROTOR OF A HELICOPTER

(71) Applicant: AIRBUS HELICOPTERS DEUTSCHLAND GMBH, Donauworth (DE)

(72) Inventors: Gerald Kuntze-Fechner, Gmund am Tegernsee (DE); Markus Bauer, Munich (DE); Martin Ortner, Unterhaching (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 797 days.

(21) Appl. No.: 13/803,009

(22) Filed: Mar. 14, 2013

(65) Prior Publication Data
US 2013/0280075 A1    Oct. 24, 2013

(30) Foreign Application Priority Data

Apr. 18, 2012  (EP) .................................... 12400013

(51) Int. Cl.
| B64C 27/00 | (2006.01) |
| B64C 27/48 | (2006.01) |
| B64C 27/33 | (2006.01) |
| B64C 27/50 | (2006.01) |

(52) U.S. Cl.
CPC .............. *B64C 27/48* (2013.01); *B64C 27/33* (2013.01); *B64C 27/50* (2013.01)

(58) Field of Classification Search
CPC ................................ B64C 27/48; B64C 27/33
See application file for complete search history.

(56) References Cited

U.S. PATENT DOCUMENTS

| 2,336,012 A | 12/1943 | Hackethal |
| 2,369,048 A | 2/1945 | Hays |
| (Continued) | | |

FOREIGN PATENT DOCUMENTS

| DE | 1481674 B1 | 2/1970 |
| EP | 0315962 A2 | 5/1989 |
| (Continued) | | |

OTHER PUBLICATIONS

Chinese Patent Application No. 201310075081.7 First Office Action, dated Dec. 29, 2014; 15 pages [with English Translation].
(Continued)

*Primary Examiner* — Charles Freay
*Assistant Examiner* — Christopher Bobish
(74) *Attorney, Agent, or Firm* — Brooks Kushman P.C.

(57) ABSTRACT

A blade attachment (1, 20) for a bearingless main rotor of a helicopter with an airfoil blade (2), a flexbeam (3, 21) including a flexbeam body (16, 17) and a flexbeam head (13) at an end of the flexbeam body (16, 17). A control cuff (4, 22) encloses and extends along at least a predominant portion of the flexbeam (3, 21). A separable junction arrangement between the flexbeam head (13), the control cuff (4, 22) and the root end of the airfoil blade (2) is mechanical with removable fasteners. The removable fasteners comprise a main bolt (7) and at least one supporting bolt (8).

20 Claims, 4 Drawing Sheets

(56) References Cited

U.S. PATENT DOCUMENTS

| | | | |
|---|---|---|---|
| 2,815,820 A * | 12/1957 | Papadakos | B64C 27/50 |
| | | | 416/143 |
| 2,830,669 A | 4/1958 | Klockner | |
| 3,056,456 A | 10/1962 | Michel et al. | |
| 3,280,918 A | 10/1966 | Drees et al. | |
| 3,310,120 A | 3/1967 | Vacca | |
| 4,227,857 A * | 10/1980 | Reyes | B64C 27/43 |
| | | | 416/134 A |
| 4,235,570 A | 11/1980 | Ferris et al. | |
| 4,340,335 A | 7/1982 | Cheney | |
| 4,427,340 A | 1/1984 | Metzger | |
| 4,580,944 A | 4/1986 | Miller | |
| 4,676,720 A * | 6/1987 | Niwa | B64C 27/51 |
| | | | 416/134 A |
| 4,696,623 A | 9/1987 | Bost | |
| 4,893,988 A | 1/1990 | Sato | |
| 4,975,021 A * | 12/1990 | Wagner | B64C 27/33 |
| | | | 416/134 A |
| 5,096,380 A | 3/1992 | Byrnes | |
| 5,263,821 A * | 11/1993 | Noehren | B64C 27/33 |
| | | | 415/115 |
| 5,738,494 A | 4/1998 | Schmaling | |
| 6,126,398 A | 10/2000 | Bauer | |
| 6,196,800 B1 * | 3/2001 | Bauer | B64C 27/33 |
| | | | 416/107 |
| 8,985,958 B2 * | 3/2015 | Ahci-Ezgi | B64C 27/48 |
| | | | 416/204 R |
| 2006/0165527 A1 | 7/2006 | Stamps | |
| 2008/0101934 A1 | 5/2008 | Stamps | |
| 2009/0155086 A1 | 6/2009 | Parisy et al. | |
| 2011/0274548 A1 | 11/2011 | Stamps | |

FOREIGN PATENT DOCUMENTS

| | | |
|---|---|---|
| FR | 1117935 A | 5/1956 |
| GB | 656797 A | 9/1951 |
| GB | 804043 A | 11/1958 |
| GB | 909617 A | 10/1962 |
| GB | 1127887 A | 9/1968 |
| JP | H07-019098 | 4/1995 |
| JP | 2750425 B2 | 5/1998 |
| WO | 2010082936 A1 | 7/2010 |

OTHER PUBLICATIONS

Korean Patent No. 10-2013-0042404 First Office Action; dated Jun. 23, 2014; 4 pages.

Search Report and Written Opinion; Application No. EP 12400013; dated Sep. 28, 2012.

\* cited by examiner

Fig.1

BLADE ATTACHMENT FOR A BEARINGLESS ROTOR OF A HELICOPTER

CROSS-REFERENCE TO RELATED APPLICATIONS

This application claims priority to European patent application No. 12 400013.4 filed Apr. 18, 2012, the disclosure of which is incorporated in its entirety by reference herein.

BACKGROUND OF THE INVENTION (1) Field of the Invention

The invention relates to a blade attachment for a bearingless rotor of a helicopter, including a lift-generating airfoil blade, a flexbeam enclosed by a control cuff or torque tube, and a connection means forming a separable or releasable junction between the airfoil blade and the flexbeam and the control cuff. The flexbeam and the control cuff can be connected or not.

(2) Description of Related Art

During operation, the rotor blades are deflected in various directions and are thereby subjected to high loads in these various directions. The rotor blades must be designed to withstand these high loads while still providing the required flexibility or articulation to allow the blades to carry out flapping, lead-lag oscillating, and pitch angle variation movements.

Typically, a rotor blade of a bearingless rotor includes a structural element known as a flexbeam at the inner end of the blade connected to the rotor head. The flexbeam supports and transmits the centrifugal forces of the blade into the rotor head. Additionally, the flexbeam includes at least portions or regions that are flexurally and torsionally soft or flexible to allow the blade to undergo the above mentioned movements in a flapping direction, a lead-lag direction, and in a pitch angle direction. The torsionally soft portion of the flexbeam is arranged within a torsionally stiff control cuff or torque tube, through which the pitch angle control movements are transmitted to the lift-generating airfoil blade portion of the rotor blade. The airfoil blade typically extends from the outboard end of the control cuff to the outermost end of the rotor blade, i.e. the blade tip.

The vibrations of the rotor blades, and particularly the oscillations in the lead-lag direction, must be damped by appropriate damping elements. The damping effectiveness of the damping elements is predominantly dependent on the effective transmission of the lead-lag oscillating movements of the airfoil blade into the damping elements. Any softness or lack of force transmission through the blade/cuff attachment to the damping element will reduce the total resulting damping effect.

In order to allow the flexbeam/cuff unit and/or the airfoil blade to be separately manufactured and/or replaced in the event of damage, or in order to allow the airfoil blade to be pivoted and folded relative to the flexbeam/cuff unit, it is desired to provide a separable or releasable junction between the flexbeam/cuff unit and the lift-generating airfoil blade.

The separable or releasable junction is subject to high technical and mechanical demands, because it must reliably carry and transmit the substantially high centrifugal forces resulting during rotation of the rotor blade and all bending moments from flapping and lead lag movements of the rotor blade. The rotor blade has a longitudinal main load axis next to 25% of the average airfoil chord of the blade profile, said main load axis being essentially covered by the pitch axis of said rotor blade. At the level of the flexbeam said longitudinal main load axis next to 25% of the average airfoil chord of the blade profile corresponds to a longitudinal middle axis of the flexbeam.

The document WO2010082936 A1 discloses a rotor assembly for a rotary-wing aircraft, the rotor having a central hub assembly with a flexure-type, twist-shank yoke with multiple arms, each arm being adapted for a rotor blade to be mounted thereto. The arms provide for pitch changes of blades attached to the yoke through twisting of portions of the arms about a corresponding pitch axis. An inboard pitch bearing associated with each arm is attached to the hub assembly and allows for rotation of the attached blade about the pitch axis, the inboard pitch bearing also allowing for out-of-plane motion of the arm relative to the hub assembly about a flapping axis. An outboard pitch bearing associated with each arm is attached to the associated arm a selected distance from the inboard pitch bearing and allows for rotation of the attached blade about the pitch axis.

The document US2008101934 A1 discloses an assembly for providing flexure to a blade of a rotary blade system including an upper support plate having an upper curved surface, a lower support plate having a lower curved surface, and a yoke positioned there between. An embodiment includes an assembly for providing flexure to a blade of a rotary blade system, including, an upper support plate having an upper curved surface, a lower support plate having a lower curved surface, and a yoke positioned there between and directly contacting the support plates wherein one of the curved surfaces is a non-circular arc that does not form part of the circumference of a circle.

The document U.S. Pat. No. 5,738,494 A discloses a composite flexbeam having a plurality of adjoining regions including a hub attachment region, a blade attachment region, a pitch region, an outboard transition region disposed between and adjoining the pitch region and blade attachment regions and an inboard transition region disposed between and adjoining the pitch and hub attachment regions. The inboard transition region includes a first transition subregion and a second transition subregion wherein the second transition subregion defines a width conic and a critical width transition subregion. The first and second inboard transition regions are composed of a combination of unidirectional and off-axis composite materials.

The document U.S. Pat. No. 5,096,380 A discloses a flexbeam for a bearingless helicopter rotor including a composite beam, composed of unidirectional fibers bound in an epoxy matrix, having ribs, composed of unidirectional fibers bound in a urethane matrix, bonded to each horizontal face at the section of the beam which accommodates lead-lag torsion.

The document EP0315962 A2 discloses a helicopter rotor blade supported by a flexbeam to be rotatable about an axis of rotation, in which a pitching motion thereof is allowable. The rotor blade is provided with a device for changing the pitch and damping the lead-lag motion thereof. The device comprises a bushing in a hole formed at the inboard end of the flexbeam, an elastomeric pivot loosely fitted in the bushing, elastomeric dampers of cylindrical shape mounted on the upper and lower surfaces of the flexbeam and coupled with the upper and lower ends of the elastomeric pivot by means of nuts, and torque arms extending through the bushing and the elastomeric dampers and having the central portion thereof connected to central shafts of the elastomeric pivots. Each of the pitch sleeves has both ends outwardly projecting beyond the elastomeric dampers and secured to a pitch sleeve which encloses the flexbeam. Therefore, the relative position between the pitch sleeve and the elastomeric pivot does not change even when lead-lag motion is imparted to the rotor blade.

The document U.S. Pat. No. 4,427,340 A discloses helicopter rotors and more particularly rotor mounting involving a composite fiber-reinforced unitary yoke with resilient inplane restraints.

The document U.S. Pat. No. 6,126,398 A discloses a rotor blade for a bearingless rotor of a helicopter with a lift-generating airfoil blade, a flexbeam connecting the airfoil blade to a rotor head, and a control cuff enclosing the flexbeam. The junction between the flexbeam and the airfoil blade is a separable junction to allow the airfoil blade to be folded in a simple manner while maintaining a high lead-lag stiffness and reduced structural height of the junction. The junction is formed by two connection arms arranged side-by-side in the lead-lag plane of the rotor blade.

The document U.S. Pat. No. 4,676,720 A discloses a bearingless hub structure for rotary-wing aircrafts comprising a hub body secured to a rotor shaft, a plurality of radially extending flexbeams integrally formed with the hub body, and pitch housings enclosing each of the flexbeams in spaced relationship, the pitch housing having a radially outer end portion rigidly secured to an inboard end of a rotor blade and a radially inner end portion supported by a spherical bearing in the vicinity of a root end of said flexbeam. The flexbeam consists of a flexible element of low lead-lag stiffness and a torsion element of low torsional stiffness located radially outside the flexible element. The flexible element consists of two beam-like members having radially inner ends spaced in the lead-lag direction and extending radially outward with narrowing the distance between them, the beam-like member having radially outer end connected to a radially inner end of the torsion element. Said document U.S. Pat. No. 4,676,720 A discloses a control cuff with an outer end fixed to the flexbeam by bolts and fixed to the rotor blade by other bolts.

BRIEF SUMMARY OF THE INVENTION

It is an object of the invention to provide an improved configuration of a blade attachment for a bearingless rotor of a helicopter and particularly to provide a separable or releasable junction between an airfoil blade and a flexbeam/cuff unit to allow the quickest and easiest possible folding of the rotor blade, while improving the lead-lag movement transfer from the rotor blade to the dampers and reducing the total structural height of the junction area in order to improve drag behavior. It is a further object of the invention to provide an especially simple and economical junction arrangement for a blade attachment.

The above objects have been achieved in a blade attachment for a bearingless rotor of a helicopter with the features of claim 1 of the invention. Preferred embodiments of the invention are presented in the subclaims.

According to the invention a blade attachment for a bearingless main rotor of a helicopter comprises an airfoil blade having a tip end and a root end forming opposite ends thereof. Said airfoil blade has a pitch axis from said tip end to said root end. The blade attachment further comprises a flexbeam including a flexbeam body and a flexbeam head at an end of said flexbeam body. Said flexbeam body is flexible so as to allow lead-lag movements, flapping movements and pitch movements of said airfoil blade.

The blade attachment still further comprises a control cuff enclosing and extending along at least a predominant portion of said flexbeam. A separable junction arrangement provides a separable connection between said flexbeam head and said root end of said airfoil blade. Said junction arrangement is mechanical between said flexbeam head, said control cuff and/or said root end of said airfoil blade with removable fasteners respectively removable connecting said root end of said airfoil blade and said control cuff with said flexbeam head. Said removable fasteners comprise at least two bolts being asymmetric with regard to said pitch axis of said airfoil blade, preferably a main bolt and at least one supporting bolt. Said main bolt may have a diameter greater than the diameter of said at least one supporting bolt.

Particularly according to the invention, the distances of each of the two bolts from the pitch axis of the airfoil blade can be different, to optimize the folding of the airfoil blade and to improve the lead lag kinematics by increasing the distances. Particularly according to the invention, the blade attachment arrangement includes a main bolt and a supporting bolt that are both arranged lying perpendicular to the lead-lag pivoting plane of the rotor blade. In this context, the lead-lag pivoting plane essentially corresponds to the rotation plane of the rotor blade. The inventive blade attachment achieves the advantage that the lead-lag pivoting stiffness at the separable or releasable junction is substantially increased by the maximized distance between said one main bolt and said supporting bolt.

Said main bolt and said supporting bolt configuration allow an integration at a suitable location of the inventive blade attachment more easily than the arrangement of a plurality of equally charged bolts provided with any of the prior art arrangements. Said main bolt is located nearby the maximum thickness of the profile of the blade attachment. The invention allows a reduced total structural height at an extended width of the profile of the blade attachment without detracting from the mechanical strength of the junction.

Consequently the inventive blade attachment achieves to configure the control cuff with a reduced profile height at the root end of said airfoil blade and therewith provide an improved overall aerodynamic configuration without any perturbing slits in the exterior profile and/or any projecting bolts of the control cuff and/or at the root end of said airfoil blade. The junction arrangement of the invention with the large distance between said main bolt and said supporting bolt also takes up and transmits the lead-lag moments so as to achieve a transfer from the airfoil blade into the lead-lag stiff control cuff, allowing improved efficiency of the lead-lag dampers arranged next to the control cuff/rotor head junction subsequently allowing less complex lead-lag dampers with reduced weight, smaller size and lower costs at fabrication and/or for maintenance during operation.

The inventive blade attachment is provided with holes for attaching the main and supporting bolts. The airfoil blade, the flexbeam and the control cuff of the invention are separately fabricated and the flexbeam with the junction arrangement can be slit into the completed control cuff for simple and fast mounting. The airfoil blade is attached to the flexbeam/cuff unit by the main bolt and the supporting bolt. The control cuff of the invention is apt to drainage, i.e. removal of any water from the inside of said control cuff. With the inventive blade attachment it is possible to pivot the lift-generating airfoil blade relative to the flexbeam and the control cuff in the lead-lag plane for the purpose of folding the blade into a folded configuration, in a very quick and simple manner. Namely, it is simply possible to remove a single one of the fastening bolts of the inventive blade attachment, in order to allow the blade to be pivoted about the other remaining bolt to achieve the desired blade folding.

With the inventive blade attachment an easy folding of the airfoil blades in both directions, forward and rearward is possible.

According to a preferred embodiment of the invention said main bolt is arranged in the area of a 10-30% chordwise axis of a profile section of said airfoil blade, preferably slightly in front of the pitch axis. With said arrangement the main bolt carries about 51-100% and the supporting bolt about 49-0% of the centrifugal and lead-lag loads.

According to a further preferred embodiment of the invention said main bolt is hollow. The empty space inside the hollow main bolt allows filling in of dynamic balance masses.

According to a further preferred embodiment of the invention said main bolt and/or said at least one supporting bolt together with or without their respective screw nuts are integrated aerodynamically into respectively associated corrugations of said profile section of said airfoil blade.

According to a further preferred embodiment of the invention said flexbeam head is fork shaped to accommodate said main bolt and said at least one supporting bolt. The airfoil blade is slit into the fork shaped flexbeam head and the control cuff surrounds the fork shaped flexbeam head.

According to a further preferred embodiment of the invention said control cuff is mechanically connected to said flexbeam by means for connecting such as an adhesive, rivets, screws, and the like.

According to a further preferred embodiment of the invention said flexbeam head is prepared for attachment of the main bolt for connecting said flexbeam head to said root end of said airfoil blade and said control cuff is prepared for reception of the at least one supporting bolt for connecting said root end of said airfoil blade to said control cuff. Flexbeam and control cuff have preferably to be mounted mechanically fix to each other for an even better transmission of loads.

According to a further preferred embodiment of the invention said root end of said airfoil blade is fork shaped, said flexbeam head has a flat stepped cross section and said root end of said airfoil blade is arranged in slits between said control cuff and said flexbeam head.

According to a further preferred embodiment of the invention said control cuff is formed with a frontal slit and a rear slit adjacent to said flexbeam head to allow forward folding of the blade by means of the main bolt and rearward folding of the blade by means of the supporting bolt.

BRIEF DESCRIPTION OF THE SEVERAL VIEWS OF THE DRAWINGS

In order that the invention may be clearly understood it will now be described in connection with preferred example embodiments, with reference to the accompanying drawings, wherein.

DETAILED DESCRIPTION OF THE INVENTION

Figure 1:
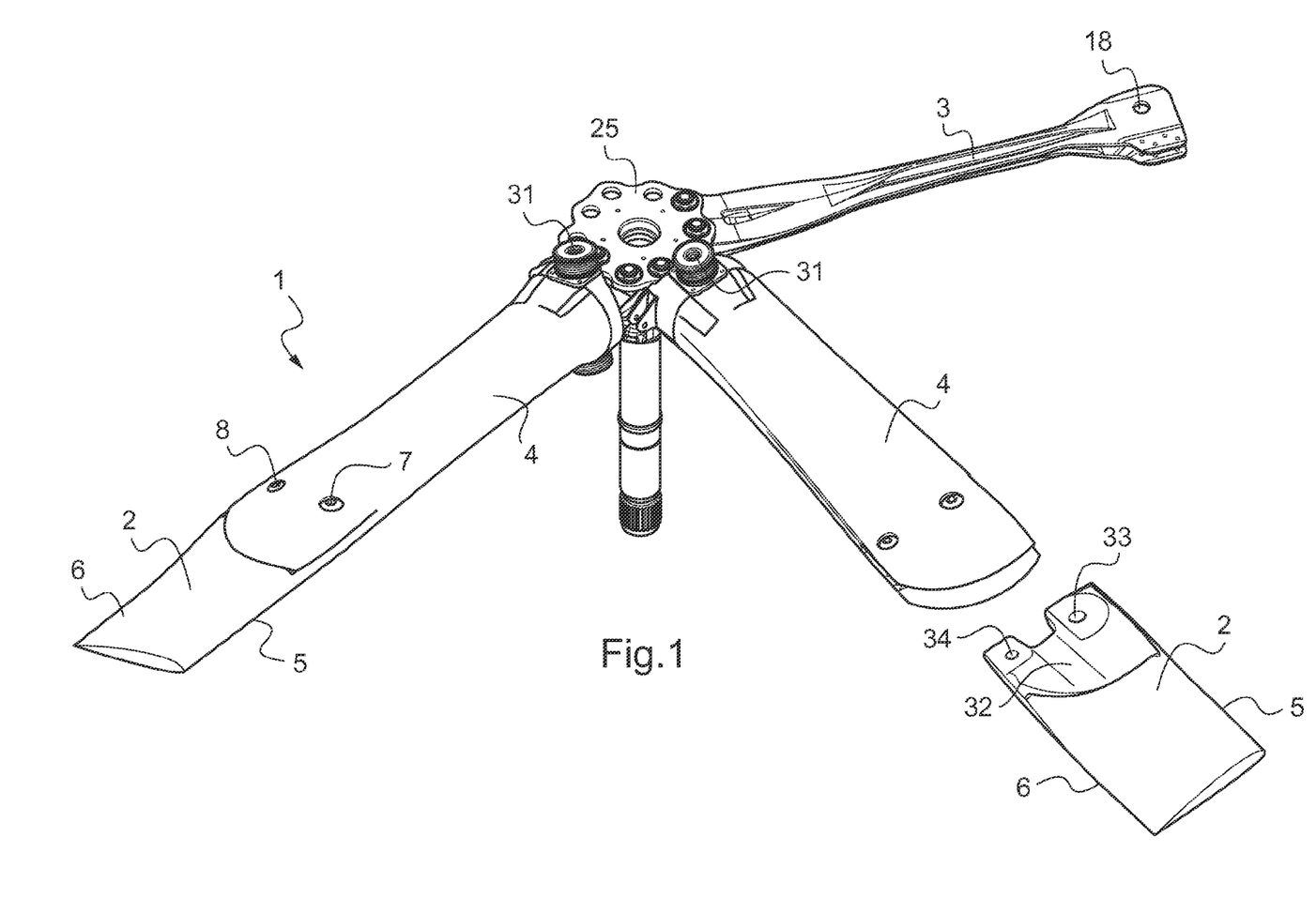
FIG. 1 is a perspective view of a rotor with a breakdown of the main components of a blade attachment according to the invention.

According to FIG. 1 a blade attachment 1 for a bearingless rotor of a helicopter (not shown) comprises an airfoil blade 2, a flexbeam 3 and a torsion stiff control cuff or torque tube 4 enclosing the flexbeam 3. The airfoil blade 2 is mounted by means of the flexbeam 3 and the control cuff 4 to a rotor head 25. Lead lag dampers 31 are arranged on the control cuffs 4 next to the rotor head 25.

The flexbeam 3 consists of a fiber-reinforced composite material. The root end of the flexbeam 3 is secured to the rotor head 25 of the helicopter (not shown). In operation each of the airfoil blades 2 rotate about an essentially vertical rotor head axis, whereby the airfoil blades 2 rotate with their lengthwise central axis in a rotor blade plane. This rotor blade plane substantially corresponds to the lead-lag pivoting or oscillating plane of the airfoil blades 2 of the bearingless rotor of the helicopter.

Each airfoil blade 2 has a leading edge 5 and a rear edge 6, a tip end (not shown) and a root end 32. Each airfoil blade 2 has a longitudinal pitch axis (not shown) between said tip end and said root end 32, said pitch axis being next to 25% of the chord of the blade profile.

The root end 32 of the airfoil blade 2 and the control cuff 4 each have two matching holes 33, 34 for respectively two bolts 7, 8, namely two bolts 7, 8 being asymmetric with regard to the pitch axis of the airfoil blade 2. The two bolts are a main bolt 7 and a supporting bolt 8 as a connection means of the blade attachment 1. The flexbeam 3 is provided with a hole 18 for a main bolt 7 as a connection means of the flexbeam 3 to the blade attachment 1.

Figure 2:
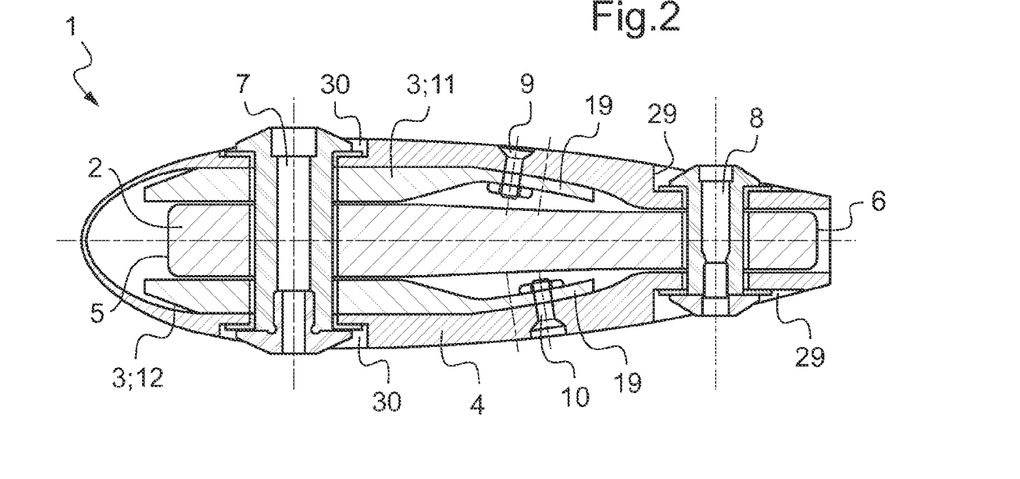
FIG. 2 is a cross sectional view of the blade attachment according to the invention.

According to FIG. 2 corresponding features are referred to with identical references. The root end 32 of the airfoil blade 2, the control cuff 4 and the flexbeam 3 each have coaxially a hole 33, 18 for a main bolt 7 as a connection means of the blade attachment 1. Said hole for the main bolt 7 is in the area of a 25% pitch axis of a profile section for said airfoil blade 2 at about a maximal height of the blade attachment 1. The root end 32 of the airfoil blade 2 and the control cuff 4 each have coaxially a further hole 34 for a supporting bolt 8 as a connection means of the blade attachment 1. Said holes 34 for the supporting bolt 8 are distant from the hole for the main bolt 7 in an area at the rear edge 6 of the airfoil blade 2.

The main bolt 7 has a greater diameter than the supporting bolt 8 to allow a load of 60% of the centrifugal loads of the airfoil blade 2 to be carried by said main bolt 7. The main bolt 7 is located at 10%-30% of the chord width of the airfoil blade 2. The supporting bolt 8 is located at 50%-90% of the chord width of the airfoil blade 2. The distance of the main bolt 7 from the supporting bolt 8 is between 40% to 80% of the chord width of the airfoil blade 2.

The main bolt 7 and the supporting bolt 8 together with any screw nuts are integrated aerodynamically into respectively associated corrugations 29, 30 of said control cuff 4.

The control cuff 4 is riveted at upper and lower mechanical connections 9, 10 to an upper fork flange 11 and a lower fork flange 12 of a fork shaped head 13 of the flexbeam 3. Additionally the control cuff 4 adheres to the upper fork flange 11 and the lower fork flange 12 of the fork shaped head 13 of the flexbeam 3. The control cuff 4 is built up with carbon layers with an orientation of +/−45°.

Figure 3:
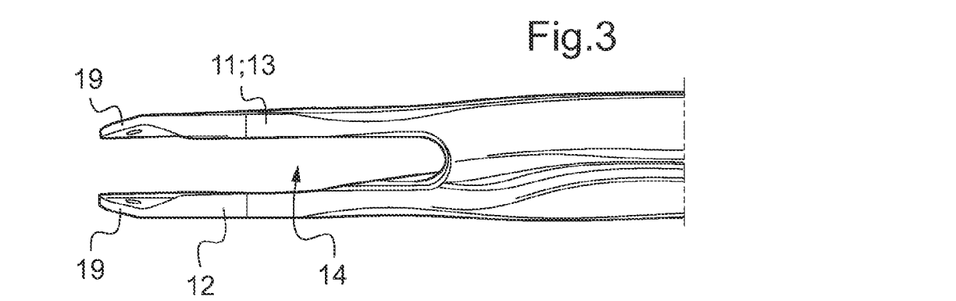
FIG. 3 is a cross sectional view of the flexbeam of the blade attachment according to the invention.
Figure 4:
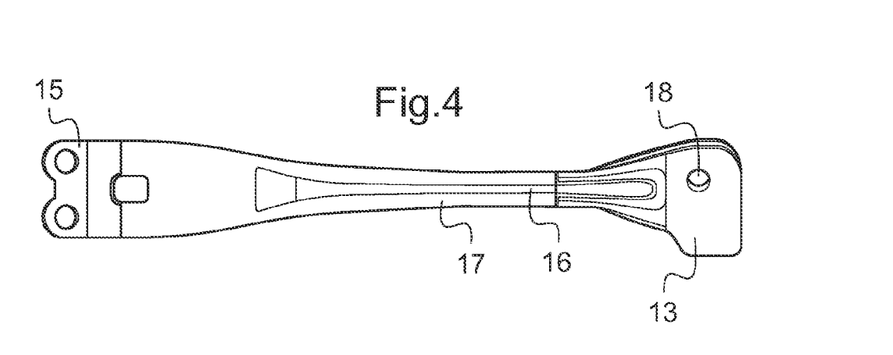
FIG. 4 is a top view of a flexbeam of the blade attachment according to the invention.

According to FIG. 3, 4 corresponding features are referred to with the same references as in FIG. 1, 2. A root end of the airfoil blade 2 is received in a gap or recess 14 between said upper and lower fork flanges 11, 12 of the fork shaped flexbeam head 13. The upper and lower fork flanges 11, 12 are provided with essentially flat surfaces adapted at their rearward oriented ends 19 to an inner circumference of the control cuff 4. A regular transition with a possibly large curvature is provided between said upper and lower fork flanges 11, 12 at the gap 14 of the fork shaped flexbeam head 13.

The flexbeam 3 is provided with attachment means 15, namely a double bolt to connect the flexbeam 3 to a rotor head (not shown). The flexbeam 3 is further provided with a lead-lag section 16 allowing lead-lag movements and a torsion flexible section 17 followed by the fork shaped flexbeam head 13 with its hole 18 for the main bolt 7.

The essentially flat surfaces of the upper and lower fork flanges 11, 12 are angled with 12° relative to the attachment means 15 of the flexbeam 3 to the rotor head.

In order to fasten or secure the lift-generating airfoil blade 2 to the flexbeam head 13, as well as to the control cuff 4, the respective aligned root end holes 33, 34 for the main bolt 7 and the supporting bolt 8 are each conceived as a respective laminated bearing of hole. The laminate comprises an approximately 0.5 mm package of glass roving alternating with an approximately 0.5 mm package of carbon fiber roving with an orientation of +/−45°.

Figure 5:
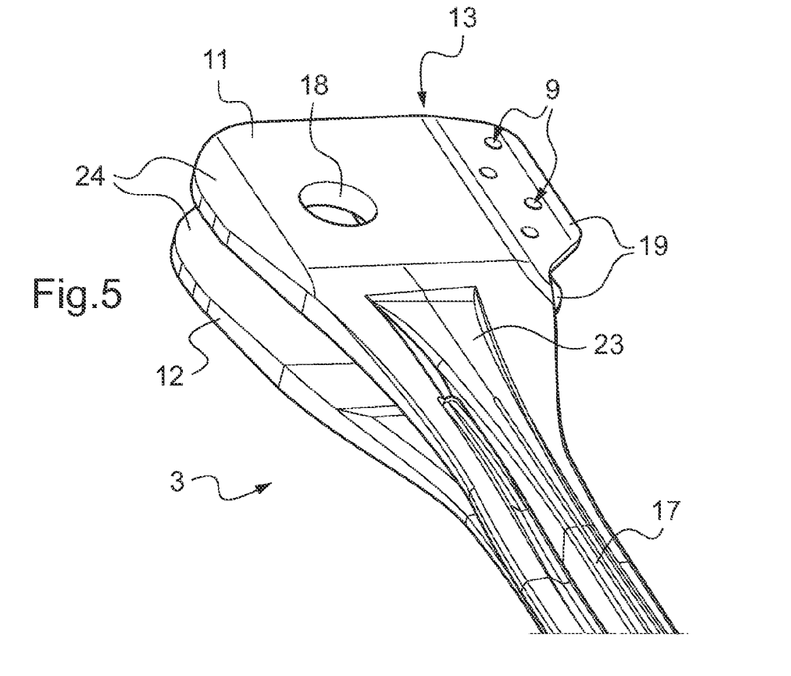
FIG. 5 is a perspective view of a flexbeam head of the blade attachment according to the invention.

According to FIG. 5 corresponding features are referred to with the same references as in FIG. 1-4. The root end of the airfoil blade 2 is received in between said upper and lower fork flanges 11, 12 of the fork shaped flexbeam head 13. The upper and lower fork flanges 11, 12 are adapted at their rearward oriented ends 19 to the inner circumference of the control cuff 4.

The flexbeam 3 is provided with an upright bar 23 at the torsion flexible section 17 and with chamfers 24 at the forward oriented ends of said upper and lower fork flanges 11, 12.

The essentially flat surfaces of the upper and lower fork flanges 11, 12 are angled with 12° relative to the attachment means 15 of the flexbeam 3 to the rotor head.

Figure 6:
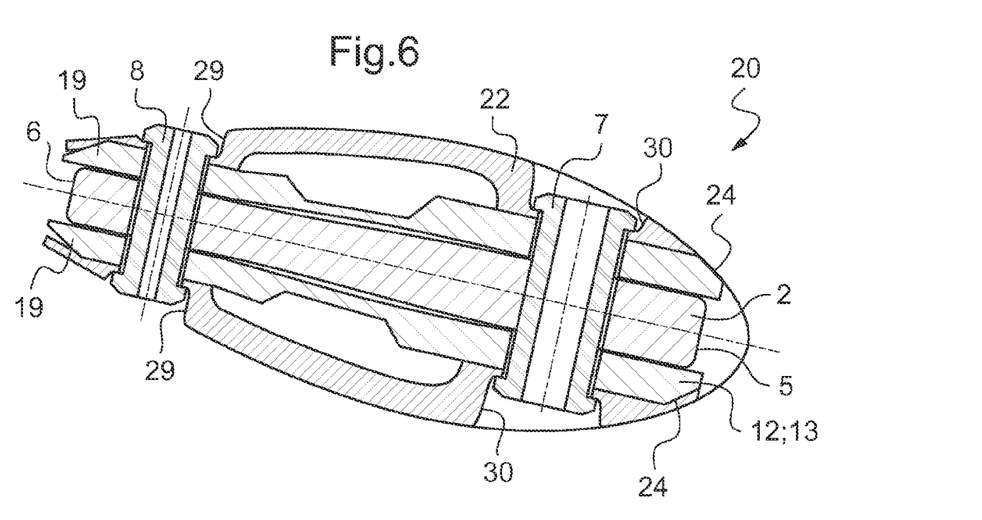
FIG. 6 is a cross sectional view of a further blade attachment according to the invention.

According to FIG. 6 corresponding features are referred to with the same references as in FIG. 1-5. FIG. 6 exhibits a variation of FIG. 1, in so far as a modified flexbeam 21 is directly connected to the root end 32 of the airfoil blade 2 with the supporting bolt 8. A further blade attachment 20 for a bearingless rotor of a helicopter comprises the airfoil blade 2, the flexbeam 21 and a torsion stiff control cuff 22 enclosing the flexbeam 21. The flexbeam 21 consists of fiber-reinforced composite material. The airfoil blade 2 has the leading edge 5 and the rear edge 6.

The root end of the airfoil blade 2, the control cuff 22 and the flexbeam 21 each have coaxially a hole for a main bolt 7 as a connection means of the further blade attachment 20. Said hole for the main bolt 7 is in the area of a 25% axis of the profile section for said airfoil blade 2 at about a maximal height of the further blade attachment 20. The root end of the airfoil blade 2, the control cuff 22 and the flexbeam 21 each have coaxially a further hole for a supporting bolt 8 as a connection means of the further blade attachment 20. Said hole for the supporting bolt 8 is distant from the hole for the main bolt 7 in an area at the rear edge 6 of the airfoil blade 2.

The main bolt 7 and the supporting bolt 8 together with any screw nuts are integrated aerodynamically into respectively associated corrugations 29, 30 of said control cuff 22.

The control cuff 22 is fixed to the upper fork flange 11 and the lower fork flange 12 of a fork shaped head 13 of the flexbeam 21.

Figure 7:
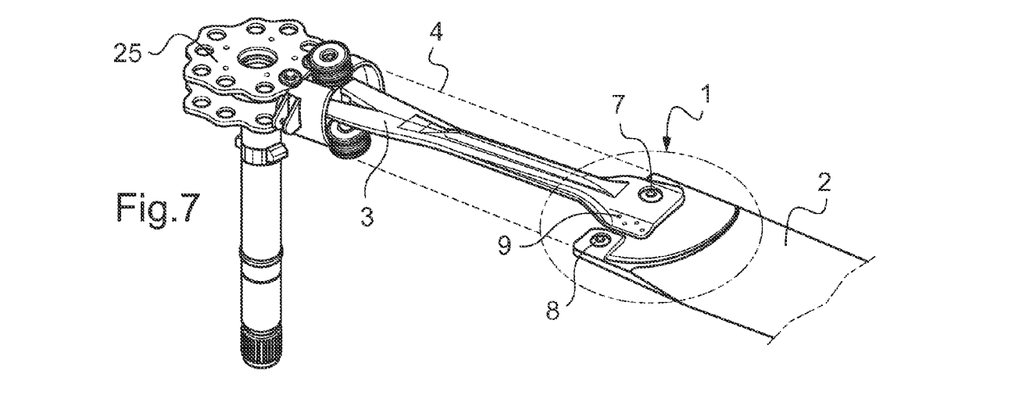
FIG. 7 is a perspective view of the cut open blade attachment according to the invention

According to FIG. 7 corresponding features are referred to with the same references as in FIG. 1-6. The blade attachment 1 for a bearingless rotor of a helicopter connects the airfoil blade 2 and the flexbeam 3. Only a section of the torsion stiff control cuff 4 next to the rotor head 25 is shown. The flexbeam 3 is provided with the main bolt 7 and with holes for the upper mechanical connections 9 for the control cuff 4. The root of the airfoil blade 2 is provided with a hole for the supporting bolt 8.

Figure 8:
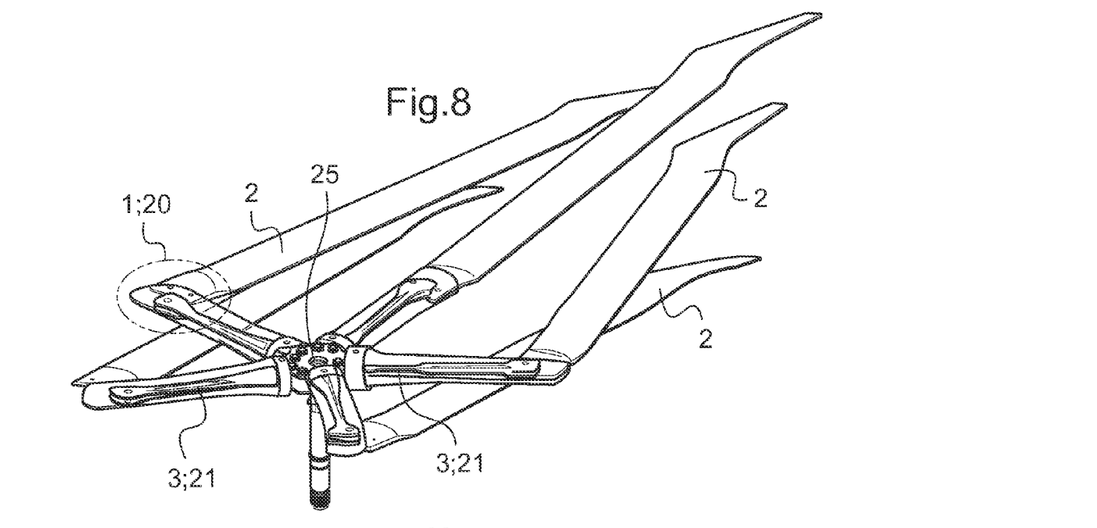
FIG. 8 is a perspective view of the blade attachment with folded airfoil blades according to the invention.

According to FIG. 8 corresponding features are referred to with the same references as in FIG. 1-7. Four of five airfoil blades 2 are pivoted around their respective blade attachments 1, 20 in essentially parallel arrangement to each other.

Figure 9:
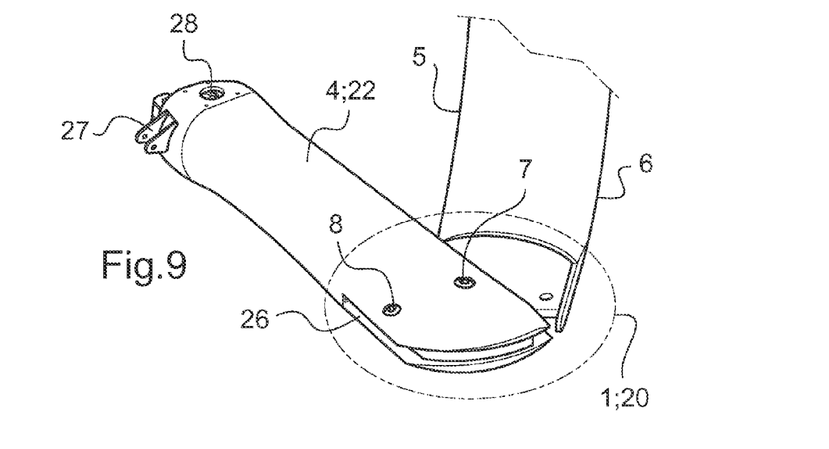
FIG. 9 is a perspective view of the blade attachment with one folded airfoil blade according to the invention.

According to FIG. 9 corresponding features are referred to with the same references as in FIG. 1-8. The control cuff 4, 22 are provided with a frontal slit adjacent to said leading edge 5 and a rear slit 26 adjacent to the rear edge 6 of the airfoil blade 2, to allow pivoting of the airfoil blades 2. For forward pivoting of the airfoil blade 2 the supporting bolts 8 have to be released and for rearward pivoting of the airfoil blade 2 (not shown) the main bolts 7 have to be released from the respective blade attachments 1, 20.

The control cuff 4, 22 is provided with a flange 27 for pitch control of the airfoil blades 2 and a reception 28 for a lead-lag damper. The transition from the flange 27 of the control cuff 4, 22 towards the junction arrangement is provided with elliptic cross sections with a flat laminated bearing of hole at the junction arrangement.

REFERENCE LIST 1 blade attachment
2 airfoil blade
3 flexbeam
4 control cuff
5 leading edge
6 rear edge
7 main bolt
8 supporting bolt
9 upper mechanical connection
10 lower mechanical connection
11 upper fork flange
12 lower fork flange
13 fork shaped head
14 gap
15 attachment means
16 lead-lag section
17 torsion flexible section
18 hole
19 rearward oriented ends
20 blade attachment
21 flexbeam
22 control cuff
23 upright bar
24 champfers
25 rotor head
26 rear slit
27 flange
28 reception
29 corrugation
30 corrugation

What is claimed is:

1. A blade attachment for a bearingless rotor of a helicopter, comprising:
    an airfoil blade having a tip end and a root end forming opposite ends thereof and having a pitch axis from the tip end to the root end;
    a flexbeam including a flexbeam body and a fork-shaped flexbeam head at an end of the flexbeam body, the flexbeam body being flexible;
    a control cuff enclosing and extending along at least a predominant portion of the flexbeam;
    a separable junction arrangement between the flexbeam head, the control cuff and the root end of the airfoil blade, wherein the junction arrangement is mechanical between the flexbeam head, the control cuff and the root end of the airfoil blade with removable fasteners respectively removably connecting the root end of the airfoil blade and the control cuff with the flexbeam head, the removable fasteners comprising a main bolt and a supporting bolt both arranged lying perpendicular to the lead-lag pivoting plane of the airfoil blade and being asymmetric with regard to the pitch axis of the airfoil blade;
    the airfoil blade having a leading edge and a rear edge, and the control cuff having a C-shaped profile in a plane perpendicular to the pitch axis of the airfoil blade, the C-shaped profile enclosing the airfoil blade, the C-shaped profile having a closed portion at the leading edge of the airfoil blade and a pair of rear portions towards the rear edge of the airfoil blade, the main bolt and the supporting bolt of the removable fasteners passing through the pair of rear portions of the control cuff.

2. The blade attachment according to claim 1, wherein the main bolt has a greater diameter than the supporting bolt.

3. The blade attachment according to claim 2, wherein the main bolt is arranged in the area of a 10-30% chord of a profile section of the airfoil blade, respectively slightly in front of the pitch axis towards a leading edge of the profile section.

4. The blade attachment according to claim 2, wherein the main bolt is hollow.

5. The blade attachment according to claim 2, wherein the main bolt or the supporting bolt together with any screw nuts are integrated aerodynamically into respectively associated corrugations of the profile section of the control cuff.

6. The blade attachment according to claim 2, wherein the flexbeam head is prepared for reception of the main bolt for connecting the flexbeam head to the root end of the airfoil blade and the control cuff is prepared for reception of the supporting bolt for connecting the root end of the airfoil blade to the control cuff.

7. The blade attachment according to claim 1, wherein a fastener mechanically connects the control cuff to the flexbeam.

8. The blade attachment according to claim 1, wherein the control cuff is formed with a rear slit adjacent to the flexbeam head.

9. A blade attachment for a bearingless rotor of a helicopter, comprising:
    a flexbeam having a flexbeam body and a fork-shaped flexbeam head at a distal end of the flexbeam body;
    a control cuff extending about a portion of the flexbeam;
    a first bolt configured to couple the flexbeam head and control cuff to a root of an airfoil blade while being positioned generally perpendicular to a lead-lag pivoting plane and spaced a first distance from a blade pitch axis;
    a second bolt configured to couple the control cuff to a root of an airfoil blade while being positioned generally perpendicular to a lead-lag pivoting plane and spaced a second distance from a blade pitch axis, wherein the first distance is different from the second distance; and
    the airfoil blade having a leading edge and a rear edge, and the control cuff having a C-shaped profile in a plane perpendicular to the pitch axis of the airfoil blade, the C-shaped profile enclosing the airfoil blade, the C-shaped profile having a closed end at the leading edge of the airfoil blade and a pair of rear ends towards the rear edge of the airfoil blade, the first and second bolts passing through the pair of rear ends.

10. The blade attachment of claim 9, wherein the fork-shaped flexbeam head has an upper flange and a lower flange, and wherein at the distal end the upper flange and lower flange each extend from a respective first side to a respective second side with an uninterrupted gap therebetween.

11. The blade attachment of claim 9, wherein the first bolt has a first diameter and the second bolt has a second diameter, the first diameter being different from the second diameter.

12. The blade attachment of claim 9, wherein the second bolt does not couple the flexbeam head to the control cuff.

13. The blade attachment of claim 9, wherein the rotor blade extends from the blade root to a blade tip and defines the pitch axis, the blade root being coupled to the flexbeam head and control cuff by the first bolt and coupled to the control cuff by the second bolt.

14. The blade attachment of claim 13, wherein the blade has a chord extending from a leading edge to a trailing edge, the first bolt being disposed between the pitch axis and the leading edge in a region between 10% and 30% chord.

15. A rotorcraft comprising: a main rotor having a rotor head;
    a flexbeam having a first end and a second end, the first end being coupled to the rotor head and the second end having a fork-shaped flexbeam head;
    a control cuff extending about a portion of the flexbeam;
    an airfoil blade having a blade root and a blade tip, the blade having a pitch axis extending from the blade root to the blade tip and defining a lead-lag pivoting plane;
    a first bolt coupling the flexbeam head and control cuff to the blade root, the first bolt being generally perpendicular to the lead-lag pivoting plane and spaced a first distance from the pitch axis;
    a second bolt coupling the control cuff to the blade root, the second bolt being generally perpendicular to the lead-lag pivoting plane and spaced a second distance from the pitch axis, wherein the first distance is different from the second distance; and
    the airfoil blade having a leading edge and a rear edge, and the control cuff having a C-shaped profile and enclosing the airfoil blade, the C-shaped profile having a closed end at the leading edge of the airfoil blade and an open end having a pair of rear portions adjacent the rear edge of the airfoil blade, the first and second bolts passing through the pair of rear portions of the control cuff.

16. The rotorcraft of claim 15, wherein the first bolt has a first diameter and the second bolt has a second diameter, the first diameter being different from the second diameter.

17. The rotorcraft of claim 15, wherein the blade has a leading edge, the blade root has a chord length, and the pitch axis passes through the blade root at 25% of the chord length from the leading edge.

18. The rotorcraft of claim 15, wherein the blade has a leading edge, the blade root has a chord length, and the first bolt being disposed between the pitch axis and the leading edge in a region between 10% and 30% of the chord length.

19. The rotorcraft of claim 15, wherein the second bolt does not couple the flexbeam head to the control cuff and blade root.

20. The rotorcraft of claim 15, wherein the fork-shaped flexbeam head has an upper flange and a lower flange, and wherein at the second end the upper flange and lower flange each have a face surface extending uninterrupted and transversely relative to the flexbeam from a respective first side surface to a respective second side surface.

\* \* \* \* \*